(12) United States Patent
Duri et al.

(10) Patent No.: US 7,401,233 B2
(45) Date of Patent: Jul. 15, 2008

(54) METHOD, SYSTEM, AND APPARATUS FOR DYNAMIC DATA-DRIVEN PRIVACY POLICY PROTECTION AND DATA SHARING

(75) Inventors: Sastry S. Duri, Yorktown Heights, NY (US); Jeffrey G. Elliott, Danbury, CT (US); Xuan Liu, Yorktown Heights, NY (US); Paul A. Moskowitz, Yorktown Heights, NY (US); George V. Salmi, Cary, NC (US); Moninder Singh, Middletown, CT (US); Jung-Mu Tang, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/603,025

(22) Filed: Jun. 24, 2003

(65) Prior Publication Data

US 2004/0267410 A1  Dec. 30, 2004

(51) Int. Cl.
H04L 9/00 (2006.01)
H04L 9/32 (2006.01)
G06F 11/30 (2006.01)
H04Q 7/28 (2006.01)
G06Q 30/00 (2006.01)

(52) U.S. Cl. .................. 713/193; 713/166; 713/170; 370/337; 705/14; 726/7

(58) Field of Classification Search ............ 726/1–10; 713/193, 166, 170; 370/337; 705/14
See application file for complete search history.

(56) References Cited

U.S. PATENT DOCUMENTS

| 6,098,048 A | 8/2000 | Dashefsky et al. |
| 6,182,048 B1 | 1/2001 | Osborn et al. |
| 6,240,365 B1 * | 5/2001 | Bunn ..................... 701/213 |
| 6,339,736 B1 | 1/2002 | Moskowitz et al. |
| 6,389,337 B1 | 5/2002 | Kolls |
| 6,401,027 B1 | 6/2002 | Xu et al. |
| 6,405,111 B2 | 6/2002 | Rogers et al. |
| 6,493,629 B1 * | 12/2002 | Van Bosch .............. 701/207 |
| 6,577,946 B2 * | 6/2003 | Myr ........................ 701/117 |
| 7,027,808 B2 * | 4/2006 | Wesby ..................... 455/419 |
| 2003/0088520 A1 | 5/2003 | Bohrer et al. |
| 2003/0130893 A1 * | 7/2003 | Farmer ..................... 705/14 |

(Continued)

OTHER PUBLICATIONS

"Secure System and Method for Enforcement of Privacy Policy and Protection of Confidentiality", IBM Corp., Aug. 30, 2002.

(Continued)

Primary Examiner—Nasser Moazzami
Assistant Examiner—Mohammad Reza
(74) Attorney, Agent, or Firm—Akerman Senterfitt

(57) ABSTRACT

A method of sharing telematics data for a vehicle with service providers can include receiving the telematics data for the vehicle, where the telematics data dynamically changes over time, and comparing the telematics data with a privacy policy associated with the vehicle. The privacy policy can specify rules for selectively releasing items of the telematics data to one or more service providers. Data items of the telematics data can be selectively provided to the service providers according to the comparing step.

8 Claims, 5 Drawing Sheets

U.S. PATENT DOCUMENTS

2003/0182360 A1* 9/2003 Mocek et al. .............. 709/203
2004/0010358 A1* 1/2004 Oesterling et al. ........... 701/49
2004/0185842 A1* 9/2004 Spaur et al. ................ 455/420

OTHER PUBLICATIONS

Borher, K., et al., "Individualized Privacy Policy Based Access Control", IBM Corp., ICECR6, Dallas, TX, Oct. 17, 2003.

Platform for Privacy Preferences 1.0 (P3P1.0) Specification, W3C, Apr. 16, 2002.

"A P3P Preference Exchange Language 1.0 (APPEL 1.0)", W3C, Apr. 15, 2002.

eXtensible Access Control Markup Language (XACML) Version 1.0), Oasis, Feb. 18, 2003.

Goodwin, R., et al., "Instance-Level Access Control for Business-To-Business Electronic Commerce", IBM Systems Journal, vol. 41, No. 2, pp. 303-317, 2002.

Snekkenes, E., "Concepts for Personal Location Privacy Policies", Proc. of the 3rd ACM Conf. on Electronic Commerce, Tampa, FL, pp. 48-57, 2001.

Duri, et al., "Framework for Security and Privacy in Automotive Telematics", IBM Corp., WMC '02, Atlanta, GA, pp. 25-32, Sep. 28, 2002.

"Privacy Minder", ATT Research, viewed Mar. 11, 2004.

"CPExchange Standards", IDEAlliance, 2004.

"IBM Business Strategy Consulting—Enterprise Privacy Architecture", IBM Corp., viewed Mar. 11, 2004.

* cited by examiner

| Entity / Mode | Fleet Manager | Assistance Provider | Location-Based Service Provider | Receiver of Shipment | Traffic Analyst | Insurance Company |
|---|---|---|---|---|---|---|
| Fleet Monitoring | All | Vehicle and/or user identification, diagnostics | None | Location of truck with shipment | Location for vehicles inside analysis area | Mileage, Diagnostics |
| Location-Based Services | Subset | None | Identification, location | None | None | None |
| Roadside Assistance | All | Vehicle and/or user identification, location | None | None | None | None |

METHOD, SYSTEM, AND APPARATUS FOR DYNAMIC DATA-DRIVEN PRIVACY POLICY PROTECTION AND DATA SHARING

BACKGROUND

1. Field of the Invention

This invention relates to the field of privacy protection and, more particularly to dynamic, data-driven privacy protection relating to telematics data.

2. Description of the Related Art

Vehicles, in effect, have become computing platforms to which mobile services and/or applications can be delivered. Automotive telematics refers to the information-intensive applications presently available and currently under development for use in vehicles. Telematics applications exploit information technology and telecommunications technology to bring useful and time saving services to the domain of vehicles.

Common examples of telematics services can include, but are not limited to, navigation information, emergency roadside assistance, location-based services, delivery of digital information such as electronic mail, entertainment, diagnostics and prognostics, and pay-for-use rental insurance. These applications are made possible through the collection and use of data relating to the location of a vehicle as a function of time, emergency situations including accidents and personal health emergencies, diagnostic data relating to the many systems within a vehicle, services and entertainment selected by the vehicle occupants, the demographics of the driver and passengers, and the behavior of the vehicle driver.

As telematics services become more pervasive, the protection of private user information has taken on an increased significance in light of the fact that existing privacy protection mechanisms are ill suited for dealing with privacy issues in the context of telematics. This is due, in large part, to the dynamic nature of the data needed to provide telematics applications. In essence, the particular services provided to a vehicle and the nature of those services can change as the information received from a vehicle changes. That is, telematics data from vehicles is routinely collected and updated as the information is dynamic and changes over time.

Within conventional computing environments, privacy policies have been developed to protect the confidentiality of private user information. Such policies attempt to protect private user information while still ensuring data sharing to enable useful applications or services. In conventional systems, data is only released if the privacy constraints of the user can be met. Thus, an end-user can be confident that any entity collecting their personal data will not use the data in a manner that is not proscribed by the end-user. Unfortunately, the efficacy of such privacy policy matching systems is completely dependent on the integrity of the people and organizations that provide the services, or otherwise have access to the data.

While some privacy systems have been developed to automatically enforce privacy policies, conventional systems have failed to address the dynamic nature of telematics data and the unique problem set that accompanies the management and protection of telematics data. In other words, the dynamic nature of telematics data—changing in space, time, and with events—means that conventional privacy policy systems based upon static information such as names, addresses, social security numbers, incomes, and the like have limited utility with regard to telematics systems.

SUMMARY OF THE INVENTION

The present invention provides a solution for selectively providing telematics data to one or more application service providers (ASP's) as needed. More particularly, telematics data can be collected from one or more vehicles. That information can be made available to ASP's according to privacy policies corresponding to the vehicles and the ASP's. The privacy policies can include various rules for selectively making telematics data available to the ASP's. For example, the rules can include, but are not limited to, temporal rules, geographic or location-based rules, event-based rules, and vehicle diagnostic rules. Accordingly, the distribution of telematics data from vehicles to various ASP's can be performed with reference to the actual content of the telematics data as well as the type of telematics data received.

The present invention can protect the privacy and confidentiality of data owners but also allow for telematics data to be shared. The sharing of telematics data enables a new business model in which services are developed based upon data derived from the vehicle. For example, real-time traffic analysis can be enabled by anonymized position and velocity data collected from a sample of vehicles on the road. Automotive manufacturers can use the feedback of diagnostic data associated with specific vehicle models to make improvements to a manufacturing line. Insurance companies can use a subset of the diagnostic and position data for improved risk analysis.

One aspect of the present invention can include a method of sharing telematics data for a vehicle with service providers. The method can include receiving the telematics data for the vehicle, wherein the telematics data dynamically changes over time, and comparing the telematics data with a privacy policy associated with the vehicle. The privacy policy can specify conditions for selectively releasing items of the telematics data to one or more service providers. Items of the received telematics data can be selectively provided to the service providers according to the comparing step.

The telematics data can include, but is not limited to, vehicle diagnostic information, vehicle location information, temporal information, and vehicle trajectory information. Other examples of telematics data can include vehicle acceleration and deceleration information and occupant information. The privacy policy can specify rules such as temporal rules, location rules, and vehicle diagnostic rules for comparing the telematics data.

The method can include receiving updated telematics data, comparing the updated telematics data with the privacy policy associated with the vehicle, and selectively providing items of the telematics data to the at least one service provider according to the step of comparing the updated telematics data. The method also can include receiving a request for information from a service provider prior to any comparing step and determining a privacy policy associated with the vehicle and the requesting service provider.

Another aspect of the present invention can include a method of sharing telematics data for a vehicle with service providers. The method can include receiving the telematics data for the vehicle, wherein the telematics data dynamically changes over time, receiving a telematics event for the vehicle, and comparing the telematics event with a privacy policy associated with the vehicle. The privacy policy can specify rules for selectively releasing items of the telematics data to one or more service providers. Items of the telematics data can be selectively provided to the service providers according to the comparing step.

As noted, the telematics data can include vehicle diagnostic information, vehicle location information, temporal information, and vehicle trajectory information. The privacy policy can specify constraint-based rules such as temporal rules, location rules, and event-based rules for sharing the telematics data under certain conditions. For example, event-based rules can correspond to vehicle diagnostic information.

Another aspect of the present invention can include a system for selectively providing telematics data of a vehicle to application service providers. The system can include a data store having telematics data for the vehicle and a data store having privacy policy information corresponding to the vehicle and an application service provider. The system further can include a request processor configured to receive requests for telematics data from and provide telematics data to the application service provider.

A privacy manager can be included that is configured to compare the privacy policy information specified by the received requests for telematics data with the stored telematics data for the vehicle. The privacy manager also can be configured to retrieve only those items of telematics data for the application service provider as specified by the privacy policy information. Additionally, the system can include an agent corresponding to each application service provider. Each agent can be configured to access telematics data on behalf of that application service provider.

Another aspect of the present invention can include a system for exchanging telematics data for a vehicle having means for receiving the telematics data for the vehicle, wherein the telematics data dynamically changes over time; means for comparing the telematics data with a privacy policy associated with the vehicle, wherein the privacy policy specifies rules for selectively releasing items of the telematics data to one or more service providers; and means for selectively providing items of the received vehicle information to the service providers according to the comparing step.

Yet another aspect of the present invention can include a system for exchanging telematics data for a vehicle having means for receiving the telematics data for the vehicle, wherein the telematics data dynamically changes over time; and means for receiving a telematics event for the vehicle. The system further can include means for comparing the telematics event with a privacy policy associated with the vehicle, wherein the privacy policy specifies rules for selectively releasing items of the telematics data to one or more service providers; and means for selectively providing items of the telematics data to the service providers according to the comparing step.

BRIEF DESCRIPTION OF THE DRAWINGS

There are shown in the drawings, embodiments which are presently preferred, it being understood, however, that the invention is not limited to the precise arrangements and instrumentalities shown.

FIG. 5 is a table excerpted from an exemplary privacy policy for use with the inventive arrangements disclosed herein.

DETAILED DESCRIPTION OF THE INVENTION

The invention disclosed herein provides a method, system, and apparatus for selectively providing automotive telematics data to one or more application service providers (ASP's) as needed. In particular, the present invention allows one to define a privacy policy that can specify which items of telematics information received from a vehicle are to be shared with service providers and the conditions under which those items are to be shared. The present invention is well suited to process the dynamic information that is characteristic of telematics data from vehicles which can include vehicle diagnostic information, geographic information relating to the location of the vehicle, as well as vehicle trajectory information, and any other information received from a vehicle equipped as described herein.

Figure 1:
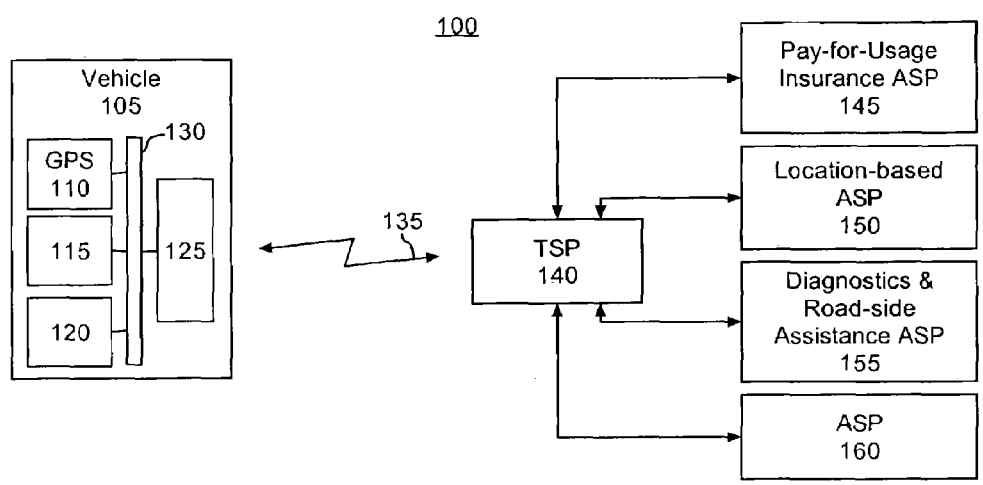
FIG. 1 is a schematic diagram illustrating a system for selectively sharing automotive telematics data with one or more application service providers (ASP's) in accordance with the inventive arrangements disclosed herein.

FIG. 1 is a schematic diagram illustrating a system 100 for selectively sharing telematics data with one or more ASP's. As shown, the system 100 can include a vehicle 105, a telematics service provider (TSP) 140, and a variety of ASP's 145, 150, 155, and 160 with which the vehicle 105 has been registered. It should be appreciated, however, that one or more vehicles can be included depending upon the particular configuration of the system 100, and that any of a variety of ASP's also can be included.

The vehicle 105 can be any of a variety of different vehicle types, whether a commercial vehicle, a personal vehicle, an automobile, a truck, a train, a boat, or the like. The vehicle 105 can be equipped with sensors 110, 115, and 120 that can be communicatively linked with a communication bus 130 of the vehicle 105. For example, the vehicle 105 can include a Global Positioning System (GPS) receiver 110.

Sensors 115 and 120 can be any of a variety of different sensors for determining vehicle diagnostic information. For example, sensors 115 and 120 can be standard sensors commonly found within a vehicle to determine information such as the number of revolutions per minute (RPM's) the engine is turning, whether the car is in motion, the amount of fuel in the vehicle, distance driven, whether one or more air bags have been deployed, the gear in which the vehicle has been placed, the time and date, the coolant temperature, the outside temperature, accelerometers, and the like. Other sensors also can be included such as cameras and biometric sensors for determining telematics data pertaining to one or more vehicle occupants. Occupant information can include the position and status of occupants, whether for an operator or passenger (s), within the vehicle, and biometric sensors for collecting biometric data for the occupants such as heart rate, or other health indicators.

The vehicle 105 further can include a wireless transceiver 125 that is communicatively linked with the communications bus 130. Accordingly, the vehicle 105 can be configured to send wireless transmissions 135 specifying any diagnostic information that is managed, tracked, or monitored by the on-board computer system or is otherwise available on the communication bus 130 of the vehicle 105. The vehicle 105 further can receive wireless communications 135 originating from the TSP 140.

The TSP 140 can be a computer system configured to communicate with one or more vehicles via wireless transmissions 135. For example, the TSP 140 can be communicatively linked with a cellular or wireless telecommunications network, a radio transceiver, or the like, to communicate with vehicle 105. According to another embodiment, the TSP 140 can include such a transceiver for wirelessly communicating with the vehicle 105.

The TSP 140 can be configured to act as an information broker on behalf of the vehicle 105. As such, the TSP 140 can receive telematics data and events from vehicle 105 via wireless transmissions 135 and store the received data. The received telematics data can be selectively provided to the ASP's 145-160 as needed. Accordingly, the TSP 140 can include one or more privacy policies corresponding to vehicles such as vehicle 105 and ASP's 145-160. Generally, the TSP 140, upon receiving telematics data from the vehicle 105, can compare the received telematics data with the stored privacy policies and determine which data, if any, is to be provided to the ASP's 145-160.

The ASP's 145, 150, 155, and 160 can be one or more computer systems executing suitable software for implementing one or more telematics-based services. For example, ASP 145 can be a pay-for-usage insurance service which accesses particular information on the TSP 140 to calculate appropriate vehicle insurance rates. In illustration, the ASP 145 can determine insurance rates based upon dynamically changing telematics data specifying the mileage a vehicle has been driven, when the vehicle is in use, the times of use, and the geographic area in which the insured vehicle is operated. Notably, the ASP 145 can be provided only with the particular information needed to determine insurance rates. This information can be specified in the privacy policy of the TSP 140.

ASP 150 can provide location based services. For example, ASP 150 can provide traffic management functions for particular geographic areas. In that case, ASP 150 can provide traffic management for a particular state. Thus, so long as vehicle 105 remains in the state to which the ASP 150 provides traffic monitoring functions, the location information of vehicle 105 can be published or made available to ASP 150. If the vehicle 105 were to leave the monitored state, ASP 150 would no longer receive location information for vehicle 105. As noted, the type of information received by ASP 150 can be limited based upon the privacy policy stored in the TSP 140. For example, ASP 150 can receive location information and vehicle type information, but no other identifying information.

ASP 155 can be a diagnostics and roadside assistance ASP that can provide location and event-based services. For example, ASP 155 can subscribe or receive information for vehicles within a particular geographic region, as was the case with ASP 150. Alternatively, ASP 155 need only be aware of a vehicle within the service region when the vehicle is in need of assistance. Accordingly, responsive to a particular event, such as the vehicle running out of fuel, the airbags being deployed, or another type of vehicular problem occurring within the geographic region serviced by ASP 155, ASP 155 can be notified or receive vehicle information concerning vehicle 105. As noted, the type of information received by the ASP 155 can change over time according to the content of the telematics data received from vehicle 105, events sent by vehicle 105, and privacy policies associated with vehicle 105 and ASP 155.

The ASP 160 can provide additional services as may be required. Each of the ASP's 145-160 can communicate with the TSP 140 via a suitable data communications network such as the Internet, the World Wide Web, a Local Area Network, a Wide Area Network, or the like, using wired and/or wireless communications as the case may be.

Figure 2:
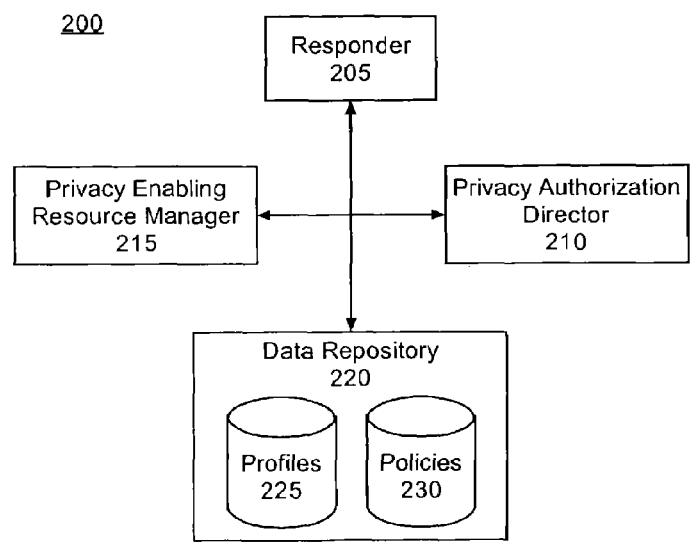
FIG. 2 is a schematic diagram illustrating an exemplary high level architecture for a data protection manager in accordance with the inventive arrangements disclosed herein.

FIG. 2 is a schematic diagram illustrating a high level architecture for a data protection manager in accordance with the inventive arrangements disclosed herein. It should be appreciated that the architecture shown in FIG. 2, however, can be implemented in a centralized fashion in a computer system as described With reference to FIG. 1 or can be located within a vehicle. For example, if located within a vehicle, rather than use a centralized server to broker information, the vehicle itself can collect telematics data and communicate directly with the ASP's via wireless communications links.

In any case, as shown, the architecture shown can include a responder 205, a privacy authorization director (PAD) 210, a privacy enabling resource manager (PERM) 215, and a data repository 220 having a profile data store 225 and a policy data store 230. The responder 205 can receive requests from ASP's and data owners, for example vehicles and/or vehicle users, and forward received requests to either the PERM 215 or the PAD 210. The responder 205 likewise can receive information and/or responses from the PERM 215 and/or the PAD 210 and forward such information, including vehicle events, to requesting ASP's, data owners, or other authorized requesters.

The PAD 210 serves several functions. In particular, the PAD 210 can be tasked with requestor verification, whether the requestor is a data owner or an authorized data user. The PAD 210 further can receive requests for creating new privacy policies, modifying existing privacy policies, or deleting privacy policies from data owners. For example, data owners can interact with a Web interface that is configured to communicate with the TSP. Alternatively, data owners can interact with an application that is local to the data owner's vehicle or other computer system that is configured to communicate with the TSP. Accordingly, the PAD 210 can read and write data user, for example ASP, and data owner profiles to and from the profile data store 225 in the data repository 220 in order to verify data owner and data user identities. The PAD 210 further can read and write privacy policy information to and from the policy data store 230.

The PERM 215 can handle administration of data stores, policies, and application registration. In addition, the PERM 215 can handle requests for private data from data users. Such requests can be forwarded to the PERM 215 from the responder 205. A typical request for data can include application credentials, privacy policy data, and description of data items. Accordingly, the PERM 215 can verify application credentials. In addition to supporting request/response protocol, the PERM 215 also can support the subscription model for data.

The PERM 215 can query the PAD 210 for authorization to respond to received data requests. After receiving authorization, the PERM 215 can read data from the profile data store 225.and a corresponding privacy policy in the policy data store 230. The PERM 215 then can return information complying with the consulted privacy policy to the requestor via the responder 205.

The data repository 220, as shown, can include a profile data store 225 and a policy data store 230. The profile data store 225 can include information corresponding to each registered user and/or vehicle. As the TSP receives updated telematics data, the profile corresponding to the source of any received information can be updated.

The policy data store 230 can include privacy policies for each user and/or vehicle. It should be appreciated that each user and/or vehicle can have one or more privacy policies stored within the policy data store 230. For example, according to one embodiment, each user or data owner can have a different privacy policy for each service to which that user and/or vehicle subscribes. Alternatively, a single privacy policy can be used for each user. That privacy policy can specify how that user's telematics data is to be shared and with which ASP's. In any case, data owners can formulate privacy policies by specifying whether particular items of telematics data such as diagnostic data, location information, vehicle identification numbers, and the like are to be released to selected ASP's and under what circumstances.

The privacy policies and the telematics data can be stored in any of a variety of different formats whether using a markup language, a database, or a combination of storage formats and/or mechanisms. For example, according to one embodiment of the present invention, the privacy policies, user profiles, telematics data, and any ASP specific data or profiles can be stored and annotated using a markup language such as Extensible Markup Language (XML).

It should be appreciated that the system 200 can be configured using any of a variety of different techniques. For example, according to one embodiment of the present invention, the PERM 215 can first obtain authorization from the PAD 210 prior to accessing information. In that case, the PERM 215 can be restricted in that only the information that the PERM 215 is authorized to access is retrieved or read. Alternatively, the PERM 215 can be configured to retrieve all data pertaining to a vehicle. Accordingly, the PERM 215 can submit the retrieved or read data from the profile data store 225 to the PAD 210. The PAD 210 then can remove any data that the requester is not authorized to receive.

Figure 3:
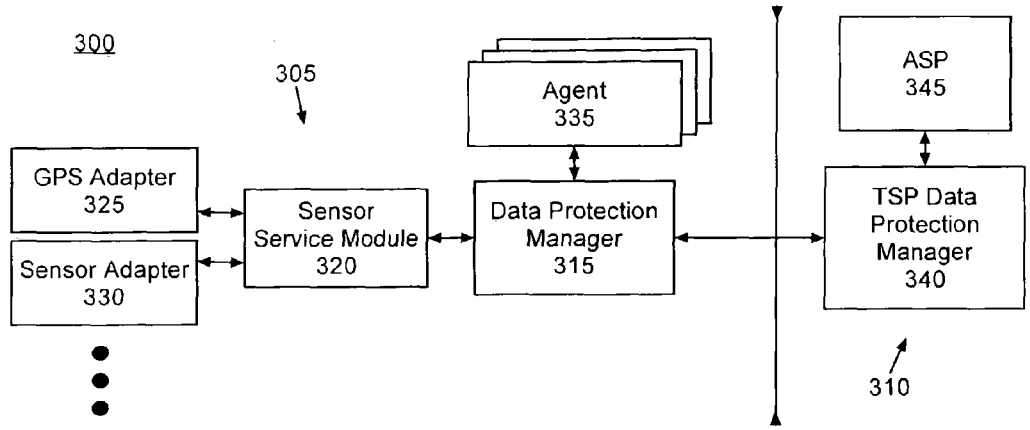
FIG. 3 is a schematic diagram illustrating another exemplary system for selectively providing telematics data to one or more ASP's in accordance with the inventive arrangements disclosed herein.

FIG. 3 is a schematic diagram illustrating a system 300 for selectively providing telematics data to one or more ASP's where communication between data sensors and applications may utilize a virtual blackboard that provides a data processing environment existing both locally (i.e., in the automobile) and remotely (e.g., at an ASP). Accordingly, as shown, the system 300 can include a subsystem 305 which resides and operates within a vehicle. Subsystem 305 can be configured to communicate over wireless communication links with a remote subsystem 310.

The subsystem 305 can include a data protection manager 315, a sensor service module 320, a GPS adapter 325, one or more other sensor adapters 330, and one or more agents 335. The data protection manager 315 provides an interface through which information producers such as GPS sensor adapter 325 and sensor adapter 330 or aggregation applications such as agents 335 can publish data. Information consumers can access the data through periodic queries or through a subscription/notification mechanism. The data protection manager 315 also serves as a communications interface with the subsystem 310. Thus, the data protection manager 315 can receive queries for information from ASP's, authenticate and verify each requester, and provide information back to the subsystem 310 via a TSP data protection manager 340.

The data protection manager 315 can be configured to receive data generated by sensors such as a GPS sensor and any other sensors, and data from the communications bus of the vehicle (not shown), inclusive of vehicle events. While data can be received from the vehicle communications bus directly into the data protection manager 315, data generated by sensors can be channeled through the sensor service module 320 which serves as an interface between each sensor adapter (driver) and the data protection manager 315. Thus, the data protection manager 315 provides the core functionality needed for data protection and controls access to private data, user policies, configuration data, and an application registry. Applications needing access to private data can be signed and registered with the data protection manager 315.

The agents 335 can be third party application programs configured to interact with the data protection manager. For example, each ASP can provide an agent which can operate as a trusted application within the vehicle computing environment. Each agent can be configured to access needed information as per their privacy policies. Agents 335 can be configured to access only selected telematics data that has been published or otherwise made available to the data protection manager 315 and that is required for the agents 335 to perform designated processing tasks. The agents 335 can process the data and write any resulting data to the data protection manager 315.

For example, an agent configured to calculate mileage can be granted access only to odometer readings that have been posted to the data protection manager 315. Alternatively, the agent can access only GPS information that has been posted to the data protection manager from time to time to calculate mileage. That is, a GPS sensor may periodically publish location data items in the data protection manager 315 via the GPS adapter 325 and senor service module 320. An application, such as a classified mileage calculator, or agent, can subscribe to the GPS data and compute, using a road map, the total mileage driven on different types of roads. The results can be published to the data protection manager 315. A risk analysis application running on an insurance server remotely also can subscribe to the aggregated and classified mileage data via the TSP data protection manager 340.

Regarding subsystem 310, the TSP data protection manager 340 can be configured to serve as an interface or intermediary between the various ASP's 345 and the data protection manager 315 of subsystem 305. More particularly, the ASP's 345 can direct requests for information to the TSP data protection manager 340. The TSP data protection manager 340 then can query the data protection manager 315 disposed within the vehicle. Thus, as the blackboard paradigm is extended across a virtual network, applications at the TSP or ASP can submit queries to, or receive notifications from, the in-car blackboard mechanism.

For example, an ASP that tracks mileage information can request such information from the TSP data protection manager 340. The TSP data protection manager 340 can query the data protection manager 315. The data protection manager 315 then can retrieve any data entries made by the requesting ASP's corresponding agent. Once an entry or entries are found, the requested information can be provided back to the TSP data protection manager 340 via the data protection manager 315. The TSP data protection manager 340 then can provide the mileage information to the requesting ASP.

Figure 4:
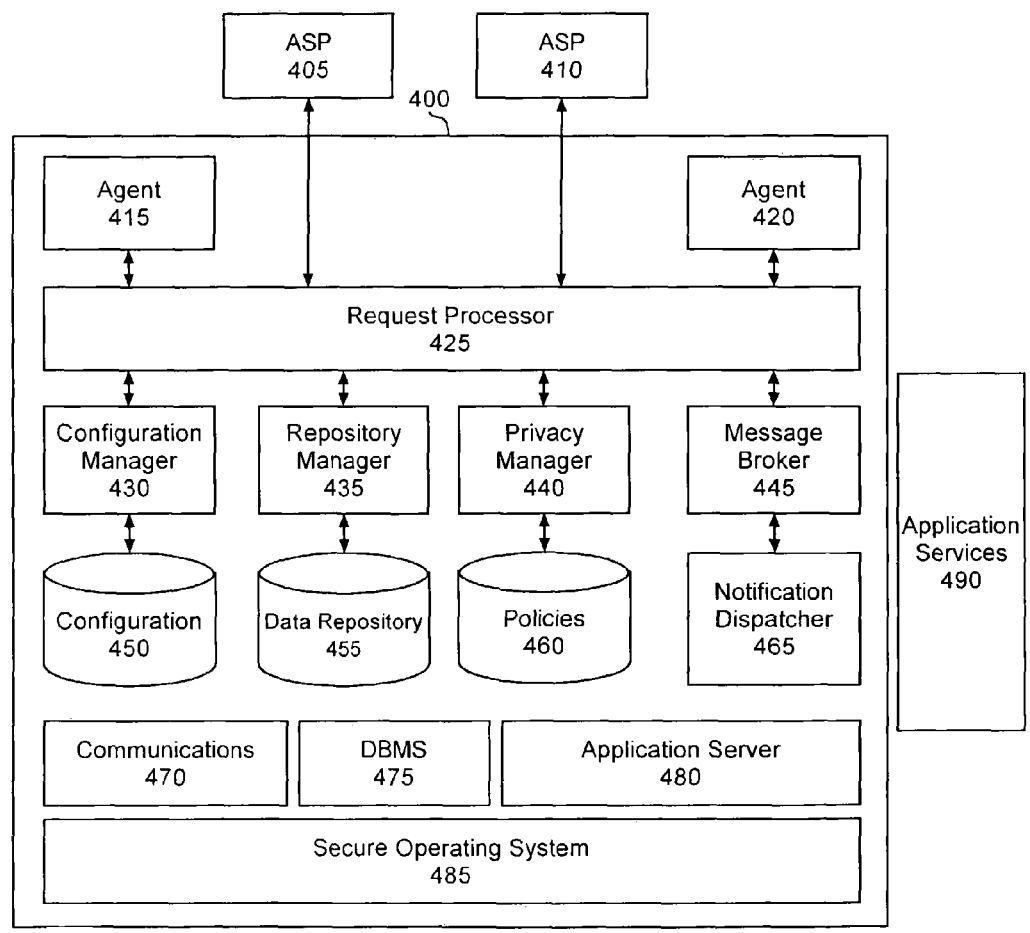
FIG. 4 is a schematic diagram of an exemplary data protection manager for selectively providing telematics data to one or more ASP's in accordance with another embodiment of the present invention.

FIG. 4 is a schematic diagram illustrating an exemplary data protection manager 400 for selectively providing telematics data to one or more ASP's in accordance with the inventive arrangements disclosed herein. The system 400 can be implemented within a TSP environment, in an ASP environment, and in a vehicle computing environment with appropriate choices for operating system, database, application execution environment, and security and communication protocols among other things.

If the data protection manager 400 is implemented in vehicle, then the ASP's 405 and 410 can communicate directly with the data protection manager 400 through suitable wireless communications links or correspond through a remotely located data protection manager as already discussed. If the data protection manager 400 is included within a central computer system such as the TSP, each ASP 405 and 410 can communicate with data protection manager 400, which in turn can correspond with an in vehicle data protection system.

The data protection manager 400 can be implemented in a variety of different environments by choosing appropriate implementations of the secure operating system 485 as well as the communications layer 470, the database management layer 475, and the application server 480. For example, in a car environment, a real-time operating system (RTOS) such as Neutrino™ by QNX™ can be utilized, whereas the TSP and ASP's can use server operating systems such as LINUX™. The application server for in-vehicle environments may use an Open Services Gateway Initiative (OSGi) based platform, while remote application servers, such as application services 490, can use WebSphere™ by the IBM Corporation, for example. The Communications layer 470 can perform encryption, authentication, and monitor network connections. For example, the communications layer 470 can support protocols such as Secure Sockets Layer (SSL) or Internet Protocol Security Protocol (IPSec). The database management services (DBMS) layer 475 can provide basic storage capabilities.

The agents 405 and 415 are deployed by an ASP or the TSP. Agents are signed by trusted third parties, and their signature is verified at the deployment time. The privacy policy accompanying agents states what private data the agents need to access and what computed data the agents are allowed to send back to a corresponding ASP or the TSP. All communication between agents and the ASPs is mediated by the data protection manager 400 to prevent agents from disclosing sensitive data to which the agent may have access. The agents can use this data to perform calculations, and can send back only the results of the calculations. Notably, the agents cannot send the private data that was used within the calculations back to an ASP or the TSP.

The privacy manager 440 can regulate application access to data and enforce all other aspects of the privacy policies including retention rules. Further, the privacy manager 440 can compare requests for information with privacy policies corresponding to the information owner, which are stored within the policy data store 460. The message broker 445 can be configured to process messages. More specifically, the message broker 445 can format messages for delivery to various ASP's as well as receive and interpret messages received via the request processor 425 from various sources. The notification dispatcher 465 can generate notifications to be posted to the request processor 425 which can then be forwarded to subscribers.

In operation, all requests are received by the request processor 425 from application service providers 501, 410, and 490. The request processor 425 can then authenticate the requestor. The request processor 425 can submit the request to the privacy manager 440 and obtain authorization for the requested data. The request processor 425 then can submit the request along with the authorization obtained from privacy manager 440 to the repository manager 435. The repository manager 435 retrieves authorized telematics data from the data repository 455. The repository manager 435 returns the authorized telematics data to request processor 425, which in turn, provides the information to the requester. The configuration manager 430 receives requests to reconfigure system settings and perform administrative functions on the data protection manager 400, as well as provide response information back to the requestor via the request processor 425. The configuration manager 430 can access a configuration data store 450, having configuration data for the data protection manager 400 stored therein, to read and/or write configuration data as may be required. The repository manager 435 can receive requests for user information, telematics information, and ASP information stored in the data repository 455 and provide requested information to the requestor via the request processor 425.

If a publish request is received by the request processor 425 from an agent, such as agent 415, the request processor can authenticate the requestor if necessary. This may not be necessary, however, as each of the agents can be a trusted agent. The request processor 425 then can submit the received request to the privacy manager 440 to obtain authorization for the publish request. The request processor 425, having received authorization from the privacy manager 440, submits the publish request with the authorization to the message broker 445. The message broker 445 submits a message notification to the notification dispatcher, which causes a notification to be published to a subscriber, for example agent 420.

As noted previously, each agent can be configured to provide information to one or more remote applications or ASP's from time to time. Alternatively, each agent can respond to queries received from the ASP corresponding to that agent.

FIG. 5 is a table 500 excerpted from an exemplary privacy policy for use with the inventive arrangements disclosed herein. Table 500 specifies a non-exhaustive listing of exemplary entities across the top row, each of which can be granted different access rights to various items of telematics data. Each of the entities can be designated to receive particular types of telematics data under designated circumstances. A non-exhaustive listing of modes is specified in the first column. It should be appreciated that any of a variety of different modes can be specified, wherein each mode can be associated with particular information and circumstances under which items of telematics data can be provided.

For example, a fleet manager having a series of vehicles on the road can be granted full access to the information of each vehicle. An assistance provider performing fleet monitoring functions can be provided with vehicle identification information such as the name of a driver or a vehicle identification number as well as diagnostic information for monitored vehicles. An assistance provider providing roadside assistance can be provided with vehicle identification information and diagnostic information. Notably, such a service provider need not be notified of the location of a vehicle until that vehicle actually needs roadside assistance. For example, when a vehicle sends a notification indicating that assistance is needed, the TSP, upon receiving the notification, can allow the service provider access to location information regarding the vehicle or provide location information to the service provider.

Table 500 also illustrates the enforcement of geographic constraints. According to table 500, a traffic analyst service provider can be provided with the location of vehicles as long as each subject vehicle remains within the geographic territory that is being monitored by that traffic analyst service provider. Once a vehicle leaves one geographic area and enters a second, whether the area be a county, a state, etc., a different traffic analyst service provider can be provided with the location information of the subject vehicle and the original service provider's access to the location information of the vehicle can be restricted.

Figure 6A:
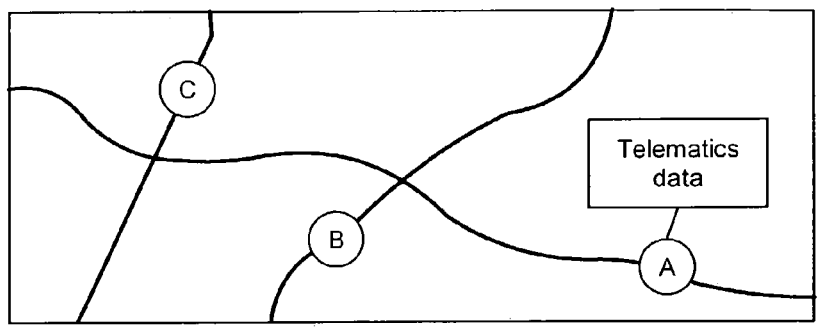
FIGS. 6A-6C are a series of exemplary graphic displays illustrating an embodiment of the present invention where different ASP's are provided with different items of telematics data regarding vehicles depending upon the privacy policy corresponding to that ASP and the content of the telematics data received from each vehicle.
Figure 6B:
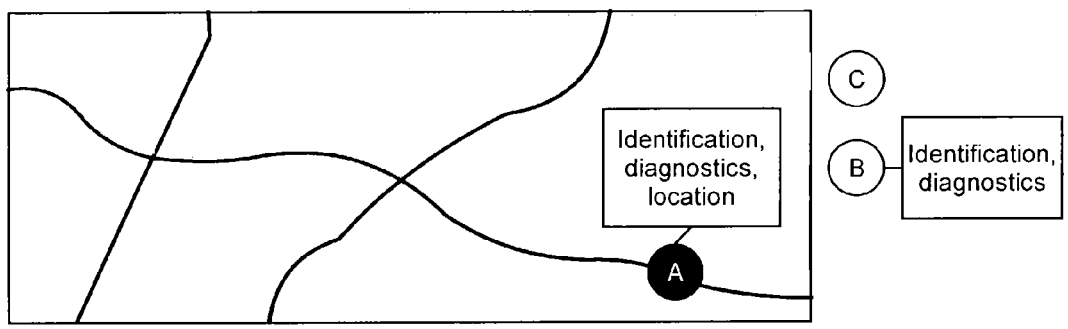
Figure 6C:
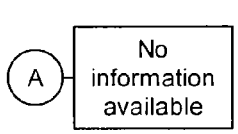

FIGS. 6A-6C are a series of exemplary graphic displays illustrating an embodiment of the present invention where different entities are provided with different items of information regarding vehicles depending upon the privacy policy corresponding to that entity and the telematics data received from each vehicle. More particularly, FIGS. 6A-6C can be included within graphical user interfaces for use by various service providers, information owners, or vehicle managers having access to the TSP.

FIG. 6A is a graphic display 600 that can be provided, for example, to a fleet manager having unrestricted access to vehicle information. As shown, the graphic display 600 illustrates the location of vehicles A, B, and C on various roadways or travel routes. By selecting a vehicle representation, for example vehicle A using a pointer device, a speech interface, or some other means, telematics data can be displayed. The information can be dynamically updated over time depending upon the configuration of the system. For example, vehicle information can be updated every several seconds, every minute, or at shorter or longer intervals as needed.

FIG. 6B is a graphic display 605 that can be presented to an assistance provider. As shown, the graphic display 605 shows three vehicles A, B, and C. The positioning of vehicles in need of assistance can be located on the map portion of the graphic display 605, while vehicles that are not in need of assistance can be represented in some other manner, for example off of the map portion of the graphic display 605. In this case, vehicle A has been shaded and located on the map portion indicating that an event has been received from vehicle A specifying that vehicle A is in need of assistance. Accordingly by selecting vehicle A, the assistance provider can view detailed information such as diagnostic information relating to vehicle A, identifying information for vehicle A, as well as more detailed location information for vehicle A, for example as can be obtained using a GPS system.

Vehicles B and C are not located on the map portion of the graphic display 605 as these vehicles have not sent events indicating a need for assistance. Still, the assistance provider can obtain more detailed information regarding vehicles B and C by clicking on each vehicle. As shown, responsive to selecting vehicle B, information such as diagnostic information and vehicle identification information can be displayed. Notably, as vehicle B is not in need of assistance (nor vehicle C), the privacy policy can specify that location data regarding vehicles that are not in need of assistance is not to be made available to the assistance provider. It should be appreciated that any of a variety of different items of information can be protected and hidden from view and/or use from one or more ASP's as dictated by the privacy policy corresponding to each vehicle and ASP.

FIG. 6C is an exemplary graphic display 610 illustrating several different aspects of the present invention. The graphic display 610 can include a map view having a bounded geographic region 615. The region 615 can indicate a region where a fleet company, for example, has contracted management services to a third party service provider. Accordingly, the view provided to the fleet company can filter telematics data received from any vehicle within region 615. For example vehicle A, although located within region 615, can be represented off of the map portion with an indicator that no information is available as vehicle A is within the contracted geographic region 615. Notably, the position of such vehicles can be withheld completely as was illustrated in FIG. 6B, or can be given generally, for example by showing a location on the map portion of the graphic display 610 without providing detailed location information.

Region 620 can correspond to a geographic region where a location-based service provider, such as a hotel reservation service for example, can be given general location information in order to process requests for reservations from any vehicles within region 620 that subscribe to that service. Thus, the general location of vehicle B can be provided to a location-based service in the event that vehicle B requests such services.

As noted, the present invention can include temporal rules within the privacy policies. For example, information received from a particular vehicle between noon and 6:00 p.m. can be provided to one ASP, while the same information provided between 6:01 p.m. and midnight can be directed to a second ASP. Notably, combinations of diagnostic rules, temporal rules, geographic rules, and event-based data can be used to selectively provide telematics data to ASP's.

Figure 7:
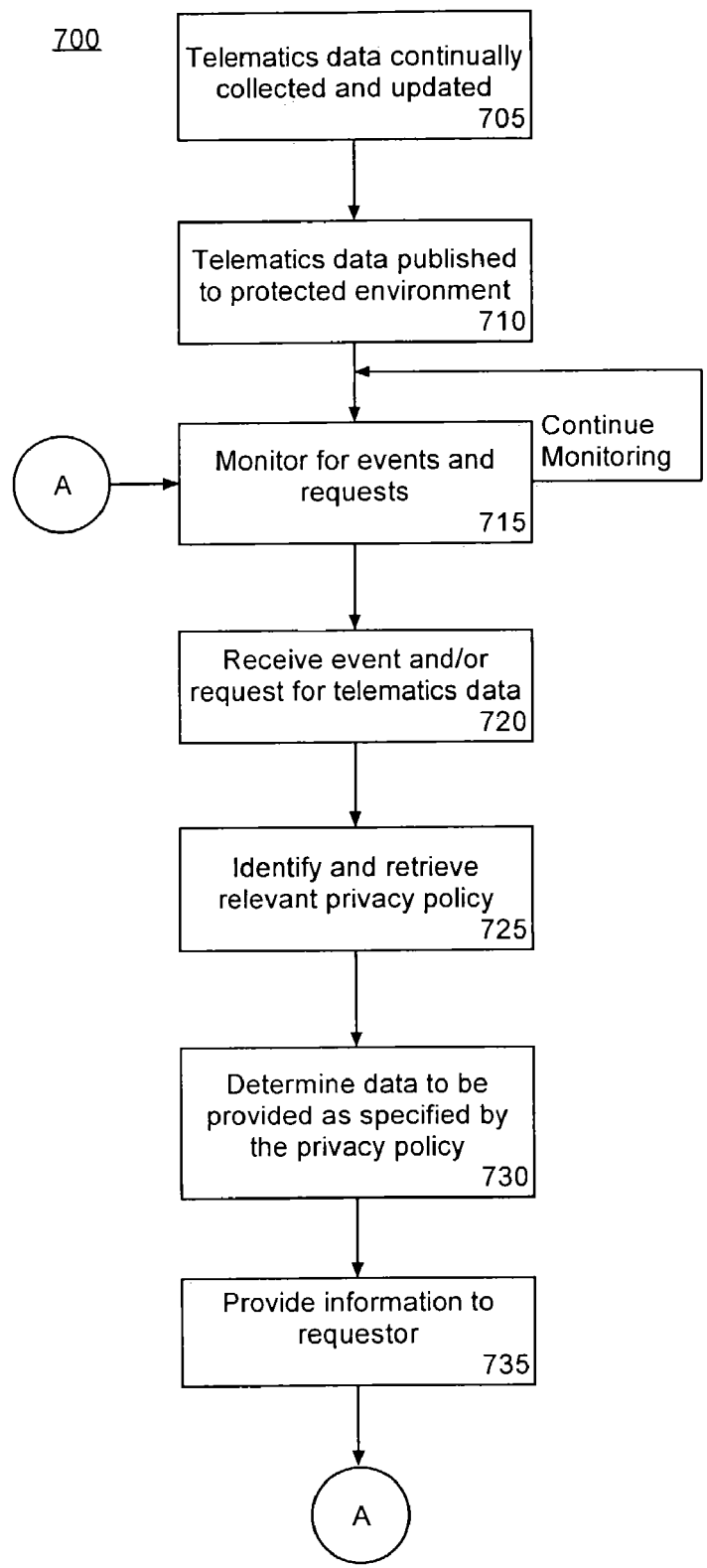
FIG. 7 is a flow chart illustrating a method of selectively providing telematics data to one or more ASP's using a privacy policy in accordance with the inventive arrangements disclosed herein.

FIG. 7 is a flow chart illustrating a method of selectively providing telematics data to one or more ASP's using a privacy policy in accordance with the inventive arrangements disclosed herein. The method can begin in a state where a vehicle is in transit, has registered for one or more telematics services, has a stored privacy policy describing the sharing of telematics data with the telematics service providers, and is equipped with various sensors, including GPS sensors, as described herein. Accordingly, in step 705, telematics data can be collected from sensors within the vehicle as well as received from the communications bus of the vehicle. The telematics data can be received at periodic intervals, from time to time, or can be received when particular items of data change. Regardless, the telematics data can be continually received and updated.

In step 710, the telematics data can be published to a protected environment. As noted, the telematics data can be wirelessly transmitted from the vehicle to a TSP or can be collected and published to a protected environment that is resident within the vehicle. In step 715, a processor executing in the protected environment can monitor for received events and requests for telematics data. As noted, events can be received from the vehicle indicating a need for a particular service. Requests for telematics data can be received from external applications and/or trusted agents. If no requests or events are received, the method can continue looping through step 715 until a request or an event is received while further telematics data is collected, updated, and published.

If an event or a request for telematics information is received, the method can continue to step 720 where the source of the event or request can be identified. For example, if an event is received, the type of the event and the particular vehicle sending the event can be identified. If a request for telematics data is received, the requesting agent and/or ASP can be identified.

Proceeding to step 725, the relevant privacy policy can be identified and retrieved. More particularly, the privacy policy corresponding to the subject vehicle, or source of the telematics data, can be retrieved. In the case where an event is received, the vehicle source of the event can be identified from the event and a corresponding privacy policy can be retrieved. If a request for telematics information is received, then either a specific vehicle can be identified from the request for information, or more than one vehicle can be identified from the request. For example, while an ASP can request information corresponding to a single vehicle, the situation also can arise where an ASP requests information for each vehicle within a particular geographic region, for particular vehicles passing through a geographic region within a particular time frame, for all vehicles belonging to a class of vehicles, etc.

In step 730, the data to be provided to the requestor can be determined as specified by the retrieved privacy policy. The privacy policy can be compared with the stored telematics data and any received events. It should be appreciated that while the telematics data is dynamic in nature, items of telematics information representing an instance or moment in time can be compared with the privacy policy.

According to another embodiment of the present invention, each service provider also can have a corresponding privacy policy. In that case, a received request for telematics data can specify the service provider's privacy policy, whether the privacy policy is provided with the request or is accessed after receiving the request, for example from a local or remote data store. The data owner's privacy policy can be compared with the service provider's privacy policy to determine whether the two policies can be reconciled. For example, the service provider's privacy policy can specify how a data owner's telematics data (and other information) will be handled after it is acquired. If the service provider's privacy policy cannot be reconciled with the data owner's privacy policy, no information need be provided to the service provider. Alternatively, only telematics data for which both privacy policies can be reconciled can be provided.

In any case, as noted, the privacy policy can specify rules specifying which items of telematics data each agent and/or ASP is authorized to receive. The privacy policy can specify which ASP is to receive telematics information, which items of telematics information are to be provided, during which times, and under what circumstances. For example, a privacy policy can specify that a first ASP is to receive location information for a vehicle while the vehicle is within a first geographic region, but a second ASP is to receive location information for that vehicle when the vehicle enters a second geographic region. Temporal rules also can be specified by the privacy policy. Thus, while the vehicle is in the second geographic region, a third ASP may receive location information, but only between the hours of noon and 2 p.m.

The privacy policy further can include rules indicating which sets of data can be considered for release. For example, a rule such as "consider only information from the past 30 days for sharing" can be implemented. This rule, while temporal in nature, defines the data set that first can be considered for release.

The privacy policy also can specify event driven rules which can, if desired, interact with the temporal and geographic constraints. For example, if a vehicle generates an event indicating a need for roadside assistance, different ASP's can be notified and provided with telematics information relevant to the problem encountered by the vehicle depending upon the time the event is issued, the geographic region in which the vehicle is located, as well as other static data such as the type of the vehicle and/or user preferences.

Privacy policy conflicts can be resolved by a set of default rules and/or a set of data owner specific conflict resolution rules. Such conflict resolution rules can be used in cases where, for example, a data owners privacy policy includes an event-based constraint specifying that location data is to be released only if an airbag is deployed within the vehicle, but also includes a geographic, or spatial, rule specifying that location data should be released only if the vehicle is within New York. Taking another example, conflict resolution rules can be used in the case where a privacy policy includes an event-based rule specifying that location data should be released only if the oil level of the vehicle goes below 20%, but also includes a geographic rule specifying that location data should be released only if the vehicle is within New York.

Thus, data owners can prioritize privacy policy rules absolutely or relative to one another. Such conflict resolution rules can be specified on an individual or group level, on a per instance basis (per event) or on a class level pertaining to all event policies or rules. For example, a data owner could implement rules indicating that event-based rules take precedence over spatial rules, that airbag deployment events take precedence over spatial rules, or that spatial rules take precedence over event-based rules.

In any case, in step 735, selected items of telematics data can be provided to the requestor as specified by the privacy policy.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of sharing with one or more service providers telematics data collected from a plurality of vehicles, the method comprising:
   receiving the telematics data from the plurality of vehicles, wherein the received telematics data dynamically changes over time;
   comparing the telematics data received from each one of said vehicles with a privacy policy associated with said each one of said vehicles, wherein the privacy policy specifies privacy policy rules for selectively releasing items of the received telematics data to said one or more service providers;
   selectively providing items of the telematics data to the one or more service providers based on the comparing step, according to which an item of telematics data is provided only if a privacy policy rule is satisfied; and
   specifying at least one conflict-resolution rule for resolving a conflict between two or more privacy policy rules, wherein if a first privacy policy rule dictates release of an item of telematics data and a second privacy policy rule dictates not releasing the item of telematics data, then the item of telematics data is provided to the one or more service providers only if the at least one conflict-resolution rule assigns a higher priority to the first privacy policy rule.

2. The method of claim 1, further comprising:
receiving updated telematics data from at least one of the plurality of vehicles;
comparing the updated telematics data with the privacy policy associated with the at least one of the plurality of vehicles; and
selectively providing items of the telematics data to the one or more service providers according to said step of comparing the updated telematics data.

3. The method of claim 1, further comprising:
receiving a request for information from at least one of the service providers prior to said comparing step; and
determining a privacy policy associated with said each one of said vehicles associated with the at least one of the requesting service providers.

4. The method of claim 1, wherein the telematics data includes at least one of vehicle diagnostic information, vehicle location information, temporal information, vehicle trajectory information, vehicle acceleration and deceleration information, and vehicle occupant information.

5. The method of claim 4, wherein the privacy policy rules include at least one of temporal rules, location rules, and vehicle diagnostic rules for comparing the telematics data.

6. A method of sharing with one or more service providers telematics data collected from a plurality of vehicles, the method comprising:
receiving the telematics data from the plurality of vehicles, wherein the telematics data dynamically changes over time;
receiving a telematics event from at least one of the vehicles;
comparing the telematics event from said at least one of the vehicles with a privacy policy associated with said at least one of the vehicles, wherein the privacy policy specifies privacy policy rules for selectively releasing items of the telematics data to said one or more service providers according to the telematics event;
selectively providing items of the telematics data to the one or more service providers based on the comparing step, according to which an item of telematics data is provided only if a privacy policy rule is satisfied; and
specifying at least one conflict-resolution rule for resolving a conflict between two or more privacy policy rules, wherein if a first privacy policy rule dictates release of an item of telematics data and a second privacy policy rule dictates not releasing the item of telematics data, then the item of telematics data is provided to the one or more service providers only if the at least one conflict-resolution rule assigns a higher priority to the first privacy policy rule.

7. The method of claim 6, wherein the telematics data includes at least one of vehicle diagnostic information, vehicle location information, temporal information, vehicle trajectory information, vehicle acceleration and deceleration information, and vehicle occupant information.

8. The method of claim 6, wherein the privacy policy rules include at least one of temporal rules, geographic rules, and vehicle diagnostic rules, said comparing step further comprising comparing the telematics data with the privacy policy.

* * * * *